Nov. 10, 1964     F. E. LAWRENCE     3,156,304
LAWN EDGER
Filed Aug. 14, 1963
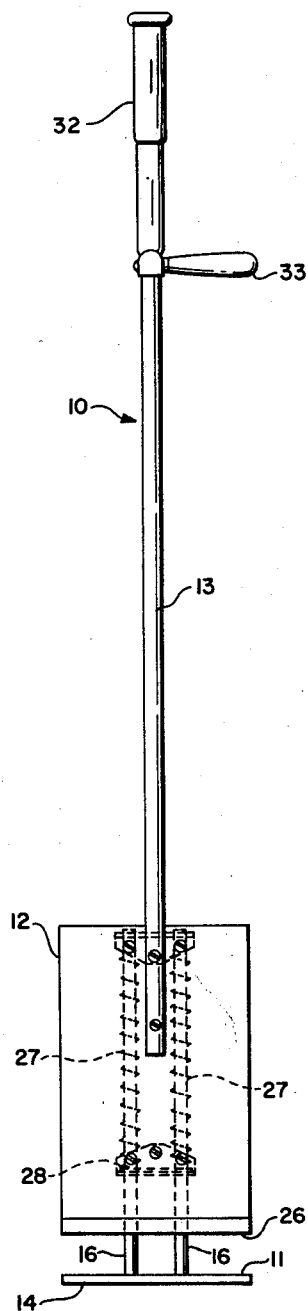
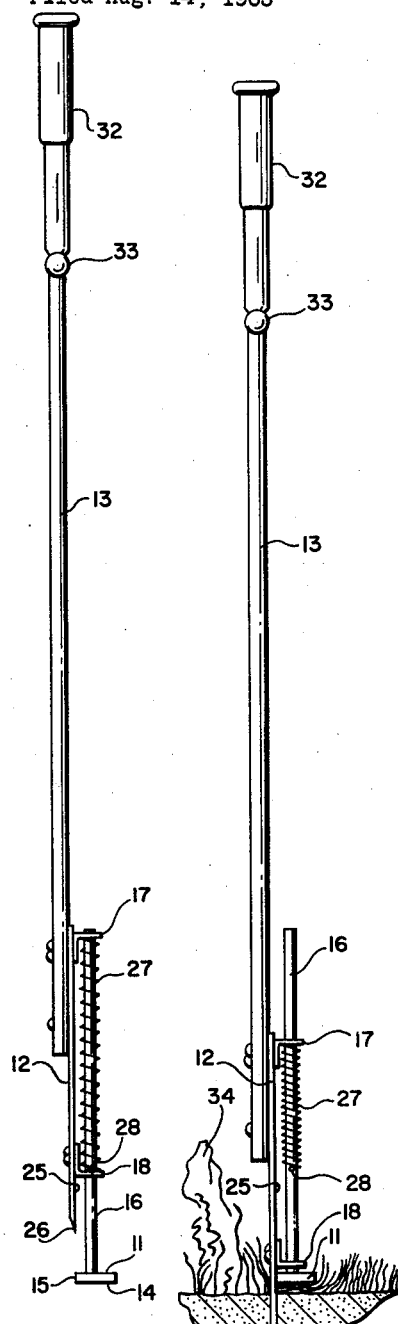
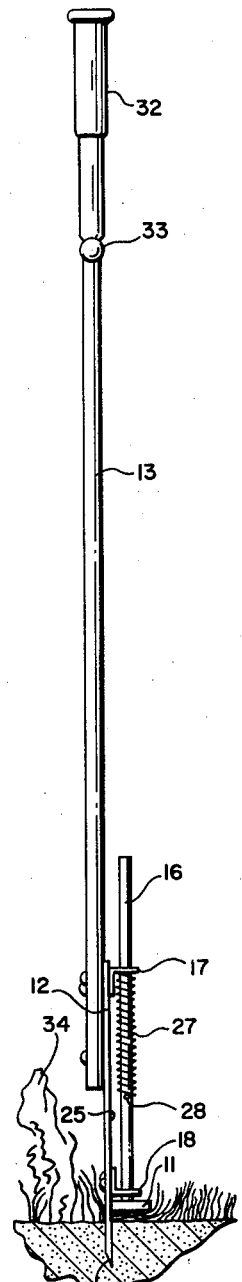
FIG.-1
FIG.-2
FIG.-3
INVENTOR.
FRANK E. LAWRENCE
BY *Watts & Fisher*
ATTORNEY

United States Patent Office 3,156,304
Patented Nov. 10, 1964

3,156,304
LAWN EDGER
Frank E. Lawrence, 232 Seminary Road, Milan, Ohio
Filed Aug. 14, 1963, Ser. No. 302,179
4 Claims. (Cl. 172—18)

This invention relates generally to lawn tools, and more specifically to new and useful improvements in lawn edgers.

Numerous attempts have been made in the past to provide a precision lawn tool capable of precisely and accurately cutting a lawn edge. However, nearly all of the prior art devices have been specifically constructed for trimming in a straight line adjacent a rigid surface, such as along driveways and sidewalks. To this end, most of the known precision edgers generally include a reciprocal cutting blade and a tracking element which is engageable over the edges of the sidewalk or driveway so as to locate the edger for each stroke of the blade.

Although useful for the specific purpose of cutting in a straight line along a sidewalk or driveway, conventional edgers as described above cannot be used conveniently to cut a neat, uniform lawn edge around corners. Further, the construction of such edgers is not adapted for precision trimming around gardens, shrubbery, and the like, where there is no rigid surface against which the tracking element can be located.

An object of the present invention is to provide a new and improved precision lawn edger adapted to cut a lawn edge in an improved manner.

Another object of the invention is to provide a new and improved precision lawn edger which is particularly useful in cutting around corners and around gardens, shrubbery, and the like, as well as along sidewalks and driveways.

A further object of the invention is to provide a lawn edger such as described above which can be operated in a convenient and facile manner.

Still another object of the invention is to provide a precision lawn edger characterized by a light-weight, inexpensive and easily manipulated construction.

Other objects of the invention will become apparent by reference to the following detailed description and the accompanying drawing.

In the drawing:

FIGURE 1 is an elevational view of the preferred lawn edger construction provided by this invention;

FIGURE 2 is a side view of the edger shown in FIG. 1; and

FIGURE 3 is a view similar to FIG. 2 and illustrates the edger in use.

Referring now to the drawings, the preferred embodiment of the precision lawn edger comprising this invention is indicated generally by reference numeral 10. The edger 10 includes a ground-engaging foot 11, a vertically acting cutting blade 12, and an operating handle 13.

In the illustrated construction, the foot 11 is a rectangular plate having a flat, ground-engaging face 14 and a locating edge 15. A pair of spaced guide rods 16 are secured to the foot plate 11 and extend from its upper face. These guide rods 16 serve to mount the cutting blade 12 for vertical reciprocal movement. The blade 12 is shown connected to the guide rods by vertically spaced, generally L-shaped brackets 17 and 18. Each of the L-shaped mounting brackets 17 and 18 has one leg secured to the blade and the other leg projecting therefrom. The projecting legs are formed with holes through which the guide rods 16 are slidably received.

The blade 12 is a flat metal plate having a face 25 which terminates at a sharp cutting edge 26. The blade 12 may be conveniently formed of steel which is flame-hardened in the area of the cutting edge. In accordance with this invention, the blade 12 is perpendicular to the foot plate 11 and is disposed so that the cutting edge 26 is movable in a plane which includes the locating edge 15 of the foot plate. Taking FIGS. 2 and 3 in conjunction, it will be seen that the blade 12 is vertically movable between a normal position in which the cutting edge 26 is above the foot plate 11 and an operative position in which the cutting edge is below the foot plate and the blade face 25 is adjacent the locating edge 15. The blade 12 is resiliently retained in its normal position by springs 27 which surround the guide rods 16. The upper ends of the springs 27 bear against the mounting bracket 17 and the lower ends of the springs are connected to a pin 28 which laterally extends through both guide rods 16. The pin 28 also is engageable with the lower mounting bracket 18 so as to locate the cutting blade in its normal position shown in FIGS. 1 and 2.

The operating handle 13 is shown as being an elongated bar having its lower end secured to the cutting blade 12. The upper end of the bar 13 is enlarged at 32 so that it can be conveniently gripped by the operator and forced downwardly to depress the cutting blade. Preferably, the handle 13 also is formed with a laterally extending arm 33 adjacent the enlarged portion 32. As will hereinafter be explained in more detail, the preferred arm 33 serves as a convenient means by which the tool 10 can be accurately positioned and actuated during an edging operation.

FIGURE 3 illustrates the edger 10 as it is used to trim around shrubbery 34. In operation, the edger 10 is positioned with the blade 12 in the normal position shown in FIG. 2 and with the foot plate 11 engaging the ground so as to press down the grass. With the foot plate positioned against the ground to hold down the grass, the blade 12 is depressed by actuating the handle 13 so as to sever off any grass projecting from beneath the foot plate along the locating edge 15. When downward pressure on the handle 13 is released, the springs 27 serve to return the cutting blade to its normal position above the foot plate.

The operator then advances the edger 10 for the next trimming operation. In so doing, the operator will stand above the edger and sight downwardly across the locating edge 15 of the foot plate. This enables the operator accurately and easily to place the edger with the locating edge 15 aligned with the previous cut. Since the cutting edge 26 of the blade 12 is movable in a vertical plane which includes the locating edge 15, actuation of the blade results in a cut which is precisely aligned with and forms a continuation of the previous cut.

When operating the edger 10 in the manner described, the extending arm 33 of the handle 13 will be grasped by the operator in one hand. As will be apparent from the description, the laterally projecting arm 33 makes it easy to manipulate and locate the edge 15 of the foot plate for each advancing cut. Further, by grasping and pressing down on the arm 33, the operator is able to hold the edger in aligned position and more comfortably to depress the blade 12 than if he were required to grip the upper end of the handle 13 with both hands.

It will be apparent from the foregoing that the novel construction of the edger 10, which includes a foot plate for locating the edger and holding the grass and a cooperating blade which is moved across a locating edge of the plate, can be easily used to cut a neat, precise lawn edge. The manipulation of the edger in cutting a precise lawn edge is further enhanced by the lateral arm 33 of the handle structure which is grasped when advancing and locating the tool and when depressing the cutting blade. It will be understood, of course, that the advantages of the new and improved lawn edger 10 are not limited to the particular trimming operation illustrated in FIG. 3. Thus, while the edger 10 can be used to cut a precise lawn edge around shrubbery, gardens, and the like where there is no rigid surface against which the tool can be aligned, the edger 10 also can be used to trim in a straight line along sidewalks and driveways. This is done in a manner similar to that described above by positioning the tool 10 so that the foot plate is on the ground adjacent the edge of the sidewalk or driveway. A straight cut is easily obtained by successively positioning the tool so that the locating edge of the foot plate slightly overlaps and is aligned with the previous cut. When trimming around corners and the like, it is a simple matter to position the edger so that the trailing edge of the foot plate coincides with the end of the previous cut. In this manner, a uniform continuous cut edge can be obtained.

Many modifications and variations of the invention will be apparent to those skilled in the art in light of the foregoing detailed disclosure. Therefore, it is to be understood that, within the scope of the appended claims, the invention can be practiced otherwise than as specifically shown and described.

What is claimed is:

1. A lawn edging device comprising:
   (a) a flat foot plate having a locating edge and a base surface substantially perpendicular to the edge,
   (b) a spaced pair of guide means extending from a top surface of said plate and disposed perpendicularly to said foot plate and said base surface,
   (c) a blade having a cutting edge,
   (d) means connecting said blade to said guide means for vertical reciprocal movement in a plane including said locating edge, said blade being movable between a first position in which said cutting edge is above said foot plate and a second position in which said cutting edge is below said foot plate,
   (e) springs associated with said guide means for urging said blade to said first position,
   (f) a stop carried by said guide means, said stop being engageable with said connecting means to locate said blade in said first position,
   (g) a vertically positionable handle member attached to said blade,
   (h) a transverse arm extending from the upper end of said handle member; and,
   (i) all of said device being above the base surface when the blade is in the first position whereby to facilitate positioning of the edging device by sliding said device over the lawn to be edged with said base surface in abutment with the lawn.

2. The device as claimed in claim 1 wherein said blade includes:
   (f) a face terminating at said cutting edge,
   (g) said blade being disposed so that said blade face is movable against said locating edge.

3. The device of claim 1 wherein said handle is connected to the blade at a location which lies in a plane passing between said spaced pair of guide means.

4. The device of claim 1 wherein said spaced guide means comprise a spaced pair of guide bars integrally connected to said plate and extending from the top surface thereof and wherein said springs are around said guide bars.

References Cited in the file of this patent

UNITED STATES PATENTS

| 871,565 | Cahoon | Nov. 19, 1907 |
| 1,532,032 | Schaefer | Mar. 31, 1925 |
| 2,007,826 | Fickes | July 9, 1925 |
| 2,513,730 | Little | July 4, 1950 |
| 2,814,875 | Seals | Dec. 3, 1957 |
| 2,962,102 | Weeren | Nov. 29, 1960 |
| 3,078,927 | Wetzel | Feb. 26, 1963 |

FOREIGN PATENTS

| 228,199 | Australia | May 17, 1960 |